United States Patent Office 2,861,083
Patented Nov. 18, 1958

2,861,083

PREPARATION OF 2,3-DIHYDROPYRAN-2-YL 2-FORMYL-2,3-DIHYDROPYRAN-2-YL CARBINOL

Howard R. Guest, Charleston, and Ben W. Kiff, Ona, W. Va., assignors to Union Carbide Corporation, a corporation of New York No Drawing. Application February 1, 1957
Serial No. 637,616

8 Claims. (Cl. 260—345.9)

This invention relates to the aldol condensation of acyl substituted pyrans. More particularly it relates to the aldol condensation of 2,3-dihydro-2-formyl-1,4-pyran (acrolein dimer) under the catalytic influence of a copper catalyst.

More particularly the present invention, which is a continuation-in-part of our application Serial No. 436,702, now abandoned, entitled "Aldol Condensation of Acrolein Dimer," relates to the aldo condensation of acrolein dimer in the presence of a copper catalyst. Copper may be used in any of its several valence forms; as copper metal, as cuprous copper, or as cupric copper, and can be used in the form of the metal, the oxides, or as organic or inorganic copper salts.

Acrolein is available commercially and may be produced by several known processes. Two molecules of acrolein can be condensed in a Diels-Alder type of reaction to give acrolein dimer, 2,3-dihydro-2-formyl-1,4-pyran. Acrolein dimer undergoes aldo condensation according to the following equation,

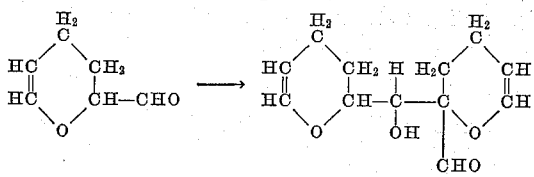

to give 2,3-dihydropyran-2-yl 2-formyl-2,3-dihydropyran-2-yl carbinol.

The aldol product is a reactive compound and polymerizes, on standing, to higher molecular weight material within a few days; it may be polymerized to form resinous products useful in coatings and films. If the aldol is hydrogenated within a few hours of its formation the compound,

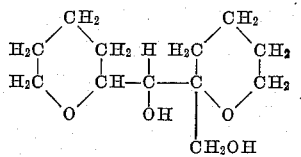

2 - methyloltetrahydropyran - 2-yl tetrahydropyran-2-yl carbinol, which is useful as a blending agent in resinous compositions, results. If the carbinol is hydrated prior to hydrogenation the product is 5-methylol-1,5,6,7-11-undecanepentol which is useful as a humectant and in the formation of polymeric materials.

A wide variety of catalysts have been employed in aldol condensations. In general in these aldolizations a basic catalyst is employed, and among such catalyst, listed in various references, are found sodium and potassium hydroxide, sodium ethoxide, sodium salts of organic acids, sodium and potassium carbonate, magnesium oxide and hydroxide, barium hydroxide, pyridine, piperidine, and dibutylamine. For aldol condensations involving ketones, sulfuric acid has proved effective; and acid reacting compounds such as acetyl chloride, sulfonyl chloride and phosphorus oxychloride have induced the aldo condensation of various aldehydes. In addition to this it is known that the condensation of acetophenone to dypnone may be brought about by aluminum chloride and aluminum bromide.

According to the teachings of British Patent 667,131, N. V. de Bataafsche Petroleum Maatschappij, the subject reaction of our invention, the aldolization of acrolein dimer, (2,3-dihydro-2-formyl-1,4-pyran) takes place in the presence of water and a basic condensation catalyst. In the procedure of B. P. 667, 131 the acyl-substituted pyrans were condensed in an aqueous alkaline medium containing large amounts of water (preferably from 10 to 70 moles of water per mole of pyran) the materials used to impart alkalinity to the water being inorganic bases and alkaline salts such as alkali metal hydroxides and carbonates and alkali metal salts of weak inorganic acids. The water was then decanted from the product, the wet product extracted with an ether-benzene mixture, washed with water, and, finally, the solvent and remaining water were removed by distillation, leaving an impure product behind. The obvious disadvantage of this method is in the recovery of the product from the watery reaction medium.

In the process of our invention no water is added to the reaction medium. We have now made the discovery that acrolein dimer undergoes aldo condensation in the presence of a copper catalyst in a substantially anhydrous medium. In distinction to the process of British Patent 667,131 we add no water to the reaction medium; neither do we use alkali metal bases or salts as catalysts. In our process the catalyst is added directly to the dimer and the dimer remains undiluted. If it is desired to hydrogenate the aldo product, the reaction mixture may be hydrogenated without intermediate purification; the copper catalyst does not interfere in the hydrogenation.

In our process we can use copper, as a catalyst, in any of its chemical forms. We can use copper metal, cuprous copper, or cupric copper. Likewise, the suitable copper catalysts encompass both organically and inorganically bound copper and include copper naphthenate, stearate, benzoate, oxalate, and the like; and inorganic salts such as copper phosphate, nitrate, sulfate and the like; though somewhat less active than the organic and inorganic copper salts, the copper oxides and copper metal are also satisfactory for use in our method. The preferred copper catalysts are the cupric salts of organic acids such as copper naphthenate, copper benzoate, and copper stearate. It is especially preferred that the catalysts be cupric salts of organic hydrocarbon acids which are either saturated or aromatic hydrocarbon acids.

With respect to copper in the form of the copper salt of an organic acid, such catalysts can be used in concentrations as low as 0.01 percent by weight based on the acrolein dimer in the reaction mixture. The preferred range of concentrations of the copper salts of organic acids in the reaction mixture is from 0.01 to 1.0 percent by weight of the acrolein dimer in the reaction mixture. Higher concentrations of catalyst can be used, if desired, although no advantages are obtained thereby.

With respect to copper metal and inorganically bound copper, it is desirable to use somewhat higher concentrations of catalyst of the order of 0.1 percent to 5 percent by weight of the acrolein dimer in the reaction mixture. However, higher concentrations can be used, if desired.

In our method we accomplish the aldolization by subjecting the mixture of acrolein dimer and the copper catalyst to elevated temperatures; temperatures in the range from 50° C. to 150° C. are preferred. However, temperatures as high as 200° C. can be employed, if pressurized equipment is used to repress the boiling point of the reaction mixture.

Our method aldolizes acrolein dimer at efficiencies as high as 83 percent and at yields as high as 76 percent. In contrast, when the method of British Patent 667,131 was employed we obtained a yield of 59 percent at an efficiency of 59 percent.

In the examples illustrative of our invention, in order to minimize loss of the aldol product and for ease of handling, the product and unreacted dimer were diluted with benzene, solely to minimize losses in handling (the presence of benzene is not necessary to the hydrogenation reaction), and then hydrogenated. The aldol product is hydrogenated according to the equation,

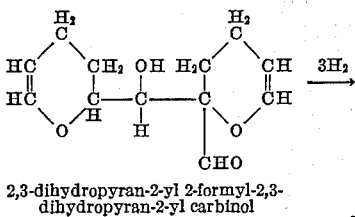

2,3-dihydropyran-2-yl 2-formyl-2,3-dihydropyran-2-yl carbinol

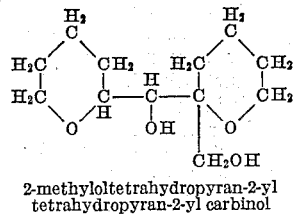

2-methyloltetrahydropyran-2-yl tetrahydropyran-2-yl carbinol and the unreacted acrolein dimer is hydrogenated according to,

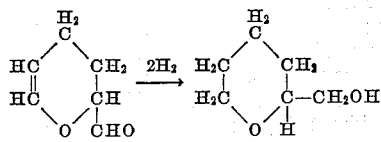

to give tetrahydropyran-2-methanol. The hydrogenated materials were separated by distillation of the tetrahydropyran-2-methanol. The hydrogenated aldol was analyzed for molecular weight, equivalent weight by hydroxyl analysis, and for percent C and percent H thus establishing the presence of the aldol intermediate.

The efficiency of the reaction was calculated on the basis of the amount of the hydrogenated dimer recovered.

The following examples are illustrative:

Example I

A charge of 500 g. of acrolein dimer and 2 g. of copper "Nuodex" solution was heated for 24 hours at 120° C. (copper Nuodex is a commercially available solution of copper naphthenate in xylene, and contains the equivalent of 8 percent copper). Without distilling off any unreacted dimer, the mixture was diluted with 500 cc. of benzene and hydrogenated at 115° C. and 100 p. s. i. hydrogen pressure using 5 percent Raney nickel catalyst. The benzene was added solely to minimize losses in handling and its presence was not necessary to accomplish the reaction. The total weight of the solution was 933 g.

The hydrogenated product was discharged from the apparatus, filtered and 840 g. of the filtrate was distilled. A total of 309 grams of the diol was obtained. A thorough analysis was made of this material to establish that the aldol had been present as the intermediate. The observed molecular weight of the diol was 233 (theoretical 230); the observed equivalent weight by hydroxyl analysis was 117 (theoretical 115); the C and H were 63.0 percent and 9.4 percent respectively (theoretical 62.6 percent and 9.6 percent).

In addition to the diol, a total of 110 grams of tetrahydropyran-2-methanol was distilled from the mixture. This product was formed from the hydrogenation of the unreacted dimer. The yield of diol was 67 percent based on the dimer charged while the efficiency was 86 percent when the recovered tetrahydropyran-2-methanol was taken into account.

Example II

In another run similar to Example I, 500 g. of the dimer was heated 24 hours at 120° C. with 1 gram of copper benzoate as the catalyst. The product from this reaction was hydrogenated and distilled. The yield of diol was 59.6 percent based on dimer charged with an efficiency of 71.4 percent, taking credit for tetrahydropyran methanol obtained in the distillate.

Example III

In another experiment, 500 g. of the dimer was heated 24 hours at 120° C. with 1 g. of cupric stearate. The mixture was hydrogenated and distilled as in the previous examples. The yield of diol was 75.6 percent based on dimer charged, and the efficiency 83.0 percent, taking credit for tetrahydropyran methanol obtained in the distillate.

Example IV

There was charged to a reaction flask 1000 g. of acrolein dimer and 20 g. of copper metal in the form of copper sponge. While the mixture was agitated with a stream of nitrogen, it was heated at 120° C. for 22 hours. The material was then transferred to an Adkins bomb without distilling off any unreacted dimer. No diluent was added. The material was then hydrogenated at 100–130° C. at 1000 p. s. i. hydrogen pressure using 3 percent Raney nickel catalyst. The product was discharged and filtered and a charge of 945 g. of the material was distilled.

After removal of tetra-hydropyran-2-methanol (from hydrogenation of unreacted dimer) as a heads cut, there was recovered 118 g. of 2-methyloltetrahydropyran-2-yl tetrahydropyran-2-yl carbinol. A residue of 24 g. of high boiling material was obtained. The yield of aldol was therefore 12.5 percent with an efficiency of 83 percent.

Example V

A charge of 1000 g. of acrolein dimer and 20 g. of cupric oxide was placed in a reaction flask. The mixture was stirred for 16 hours at 120° C. It was transferred to an Adkins bomb without dilution and hydrogenated using 3 percent Raney nickel catalyst at 110–120° C. at 1000 p. s. i. hydrogen pressure. After discharging and filtering, 954 g. of the material was distilled. A heads cut of tetrahydropyran-2-methanol was first collected, then a total of 155 g. of 2-methyloltetrahydropyran-2-yl tetrahydropyran-2-yl carbinol was obtained. There remained 86 g. of high boiling residue. The yield of aldol therefore was 16.2 percent with an efficiency of 64.3 percent.

Example VI

A charge of 1000 g. acrolein dimer and 20 g. of cuprous oxide was placed in a reaction flask. While the temperature was held at 120° C. the mixture was stirred for 24 hours. It was then transferred to an Adkins bomb and hydrogenated at 110–120° C. at 1000 p. s. i. hydrogen pressure using 3 percent Raney nickel catalyst. The product was discharged and filtered and 923 g. of the material was distilled. From this distillate there was obtained 117 g. of the diol which corresponded to a yield of 12.7 percent for the aldol reaction. There was 52 g. of high boiling residue. The efficiency therefore was 69 percent.

Example VII

A charge of 1000 g. of acrolein dimer and 20 g. of cupric phosphate (CuHPO$_4$) was placed in a reaction flask. The mixture was stirred for 14 hours at 120° C. It was then transferred to an Adkins bomb and hydrogenated at 120° C. and 1000 p. s. i. hydrogen pressure. It was discharged and filtered and 945 g. of the filtrate was distilled in the usual manner. There was obtained 189 g. of the diol which indicated a yield of 20 percent for the aldol reaction. There was 157 g. of high boiling residue. The efficiency therefore was 54.7 percent.

*Example VIII*

Example VIII shows the results obtained employing the procedure of British Patent 667,131.

A comparative run was made in which the condensation was accomplished in aqueous sodium hydroxide. A solution of 2.5 grams of sodium hydroxide in 1000 cc. of water was placed in a reaction flask and 224 grams of acrolein dimer was fed to it over a period of 15 minutes. After a 4-hour reaction period the water-insoluble material was extracted with benzene. The benzene solution was charged to an Adkins bomb and hydrogenated at 100° C. and 1000 p. s. i. hydrogen pressure using 5 percent Raney nickel catalyst. The product was distilled and 135 g. of material was obtained which was identical with the 2-methyloltetrahydropyran-2-yl tetrahydropyran-2-yl carbinol from the copper-catalyzed reaction. The yield of diol was 58.7 percent based on the dimer charged and the efficiency was identical with the yield.

What is claimed is:

1. The method for the aldolization of acrolein dimer which comprises subjecting a mixture of 2,3-dihydro-2-formyl-1,4-pyran and a copper catalyst to elevated temperatures to obtain 2,3-dihydropyran-2-yl 2-formyl-2,3-dihydropyran-2-yl carbinol.

2. The method for the aldolization of acrolein dimer which comprises subjecting a mixture of copper metal and 2,3-dihydro-2-formyl-1,4-pyran to elevated temperatures to obtain 2,3-dihydropyran-2-yl 2-formyl-2,3-dihydropyran-2-yl carbinol.

3. The method for the aldolization of acrolein dimer which comprises subjecting a mixture of copper catalyst comprised of cuprous copper and 2,3-dihydro-2-formyl-1,4-pyran to elevated temperatures to obtain 2,3-dihydropyran-2-yl 2-formyl-2,3-dihydropyran-2-yl carbinol.

4. The method for the aldolization of acrolein dimer which comprises subjecting a mixture of copper catalyst comprised of cupric copper and 2,3-dihydro-2-formyl-1,4-pyran to elevated temperatures to obtain 2,3-dihydropyran-2-yl 2-formyl-2,3-dihydropyran-2-yl carbinol.

5. The method for the aldol condensation of acrolein dimer which comprises subjecting a mixture of 2,3-dihydro-2-formyl-1,4-pyran and copper naphthenate to elevated temperatures, said copper naphthenate being present in an amount of at least 0.01 percent by weight of the 2,3-dihydro-2-formyl-1,4-pyran, to obtain 2,3-dihydropyran-2-yl 2-formyl-2,3-dihydropyran-2-yl carbinol.

6. The method for the aldol condensation of acrolein dimer which comprises subjecting a mixture of 2,3-dihydro-2-formyl-1,4-pyran and copper stearate to elevated temperatures said copper stearate being present in an amount of at least 0.01 percent by weight of the 2,3-dihydro-2-formyl-1,4-pyran, to obtain 2,3-dihydropyran-2-yl 2-formyl-2,3-dihydropyran-2-yl carbinol.

7. The method for the aldol condensation of acrolein dimer which comprises subjecting a mixture of 2,3-dihydro-2-formyl-1,4-pyran and copper benzoate to elevated temperatures, said copper benzoate being present in an amount of at least 0.01 percent by weight of the 2,3-dihydro-2-formyl-1,4-pyran, to obtain 2,3-dihydropyran-2-yl 2-formyl-2,3-dihydropyran-2-yl carbinol.

8. The method for the aldol condensation of acrolein dimer which comprises subjecting a mixture of 2,3-dihydro-2-formyl-1,4-pyran and copper phosphate to elevated temperatures, said copper phosphate being present in an amount of at least 0.1 percent by weight of the 2,3-dihydro-2-formyl-1,4-pyran, to obtain 2,3-dihydropyran-2-yl 2-formyl-2,3-dihydropyran-2-yl carbinol.

References Cited in the file of this patent

UNITED STATES PATENTS

| | | |
|---|---|---|
| 2,212,894 | Allen | Aug. 27, 1940 |
| 2,610,193 | Whetstone | Sept. 9, 1952 |

OTHER REFERENCES

Sherlin et al.: C. A., vol. 32, July–September 1938, page 5398.